(12) United States Patent
Soy

(10) Patent No.: US 11,117,504 B2
(45) Date of Patent: Sep. 14, 2021

(54) HEADREST FOR A MOTOR VEHICLE SEAT

(71) Applicant: TESCA FRANCE, Paris (FR)

(72) Inventor: Albert Soy, Amer (ES)

(73) Assignee: TESCA France, Paris (FR)

( * ) Notice: Subject to any disclaimer, the term of this patent is extended or adjusted under 35 U.S.C. 154(b) by 0 days.

(21) Appl. No.: 16/626,405

(22) PCT Filed: Jun. 28, 2018

(86) PCT No.: PCT/FR2018/051603
§ 371 (c)(1),
(2) Date: Dec. 24, 2019

(87) PCT Pub. No.: WO2019/002785
PCT Pub. Date: Jan. 3, 2019

(65) Prior Publication Data
US 2020/0215948 A1    Jul. 9, 2020

(30) Foreign Application Priority Data

Jun. 29, 2017 (FR) ...................................... 1756012
Apr. 26, 2018 (FR) ...................................... 1853697

(51) Int. Cl.
*B60N 2/90*    (2018.01)
*B60N 2/874*   (2018.01)

(52) U.S. Cl.
CPC ............ *B60N 2/933* (2018.02); *B60N 2/874* (2018.02); *B60N 2002/924* (2018.02)

(58) Field of Classification Search
None
See application file for complete search history.

(56) References Cited

U.S. PATENT DOCUMENTS 4,265,482 A * 5/1981 Nishimura ............... A47C 7/38
                                                    297/391
6,129,421 A * 10/2000 Gilson ..................... B60N 2/85
                                                    297/408

(Continued)

FOREIGN PATENT DOCUMENTS

| DE | 10335517 A1 | 3/2005 |
| FR | 2910406 A1 | 6/2008 |
| FR | 3000923 A1 | 7/2014 |

OTHER PUBLICATIONS

International Search Report issued in corresponding application No. PCT/FR2018/051603, dated Oct. 23, 2018.

*Primary Examiner* — David E Allred
(74) *Attorney, Agent, or Firm* — Murtha Cullina LLP

(57) ABSTRACT

The invention relates to a headrest comprising two legs, a transverse strut connecting the upper portions of the legs, a housing rotatably mounted on a transverse axis with a locking device. The locking device locks the housing in the raised position, with a first spring for actuating the housing to the lowered position when the device is deactivated. The locking device has two locking catches each formed in an upper portion of each of the legs, a locking crosspiece provided with two locking projections fitting into one of the catches each when the crosspiece is in the locking position. The invention includes a an actuator for actuating the crosspiece to the unlocked position, and a second spring for actuating the crosspiece to the locking position when the housing is in the raised position and when the actuator is not activated.

10 Claims, 6 Drawing Sheets

(56) References Cited

U.S. PATENT DOCUMENTS

| | | | | |
|---|---|---|---|---|
| 6,302,485 B1* | 10/2001 | Nakane | .................. | B60N 2/874 |
| | | | | 297/408 |
| 6,880,890 B1* | 4/2005 | DeBrabant | ............. | B60N 2/856 |
| | | | | 297/408 |
| 6,983,995 B1* | 1/2006 | Veine | ........................ | A47C 7/38 |
| | | | | 297/391 |
| 7,325,877 B2* | 2/2008 | Brockman | ............. | B60N 2/844 |
| | | | | 297/408 |
| 7,740,319 B2* | 6/2010 | Furukawa | .............. | B60N 2/856 |
| | | | | 297/408 |
| 8,157,328 B2* | 4/2012 | Brunner | ................. | B60N 2/844 |
| | | | | 297/408 |
| 8,511,751 B2* | 8/2013 | Bruck | .................... | B60N 2/856 |
| | | | | 297/408 |
| 8,746,800 B2* | 6/2014 | Reel | ........................ | B60N 2/809 |
| | | | | 297/410 |
| 8,833,860 B2* | 9/2014 | Fey | ........................ | B60N 2/818 |
| | | | | 297/408 |
| 8,864,236 B2* | 10/2014 | Sayama | ................. | B60N 2/844 |
| | | | | 297/408 |
| 10,618,441 B2* | 4/2020 | Nuss | ....................... | B60N 2/844 |
| 2007/0284929 A1* | 12/2007 | Keller | .................... | B60N 2/856 |
| | | | | 297/408 |
| 2008/0203801 A1* | 8/2008 | Jammalamadaka | ... | B60N 2/859 |
| | | | | 297/408 |
| 2010/0327645 A1* | 12/2010 | Jeong, II | ................ | B60N 2/853 |
| | | | | 297/408 |
| 2014/0070586 A1* | 3/2014 | Tachikawa | ............. | B60N 2/206 |
| | | | | 297/340 |

\* cited by examiner

HEADREST FOR A MOTOR VEHICLE SEAT

CROSS-REFERENCE TO RELATED APPLICATIONS

This application claims the benefit of International application number PCT/FR2018/051603, filed Jun. 28, 2018 and French application number 1756012, filed Jun. 29, 2017 and French application number 1853697, filed Apr. 26, 2018 the entire contents of which are incorporated herein by reference.

TECHNICAL FIELD

The invention relates to a headrest for a motor vehicle seat.

BACKGROUND

It is known to produce a headrest for a motor vehicle seat, the headrest comprising:
- two parallel metal legs for mounting on a seatback of the seat,
- a transverse strut connecting the upper portions of the legs,
- a housing made of moulded plastic material for the adsorption of energy in case of impact of the head of a passenger on the headrest, the housing being rotatably mounted about a transverse axis, in such a way as to be able to switch from a raised position of use to a retracted lowered position,
- an upholstered cushion of the housing,
- a device for locking the housing in the raised position,
- a first spring means of actuating the housing to the lowered position thereof when the device is deactivated.

Being able to bring the housing to the lowered position makes it possible in particular to free up the view towards the rear when the corresponding seat is not occupied, and possibly, when carrying out a lowered position towards the front, to create a hindrance that obliges the occupant to place the housing in the position of use.

Various arrangements have been proposed, but they generally require a large multiplicity of elements, with the locking device requiring the adding of specific components associated with the legs or with the strut.

They then often have a weight, a cost and a size that are substantial.

The invention has for purpose to overcome these disadvantages.

To this effect, the invention proposes a headrest for a motor vehicle seat, the headrest comprising:
- two parallel metal legs for mounting on a seatback of the seat,
- a transverse strut connecting the upper portions of the legs,
- a housing made of moulded plastic material for the adsorption of energy in case of impact of the head of a passenger on the headrest, the housing being rotatably mounted about a transversal axis, in such a way as to be able to switch from a raised position of use to a retracted lowered position,
- an upholstered cushion of the housing,
- a device for locking the housing in the raised position,
- a first spring means for actuating the housing to the lowered position thereof when the device is deactivated, the device comprising:
- two locking catches each formed in the upper portion of each one of the legs,
- a locking crosspiece mounted with transversal sliding in the housing, in such a way as to be able to switch from a locking position to an unlocked position, the crosspiece being provided with two locking projections fitting respectively into each one of the catches when the crosspiece is in the locking position,
- a means for actuating the crosspiece to the unlocked position thereof,
- a second spring means for actuating the crosspiece to the locking position thereof when the housing is in the raised position and when the actuation means is not activated.

In this description, the terms of positioning in space (upper, transversal, lateral, front, etc.) are taken in reference to the headrest arranged in a situation of use in the vehicle.

With the arrangement proposed, specific components associated with the legs or with the strut are not called into play to produce the locking device, knowing that it is simply sought to produce locking catches on the legs.

This results in a decrease in weight, in cost and in the size of the headrest.

Note furthermore that having two locking catches arranged laterally allows for a perfect locking of the housing.

BRIEF DESCRIPTION OF THE DRAWINGS

Other particularities and advantages of the invention shall appear in the following description, given in reference to the accompanying figures, wherein.

DETAILED DESCRIPTION

Figure 1:
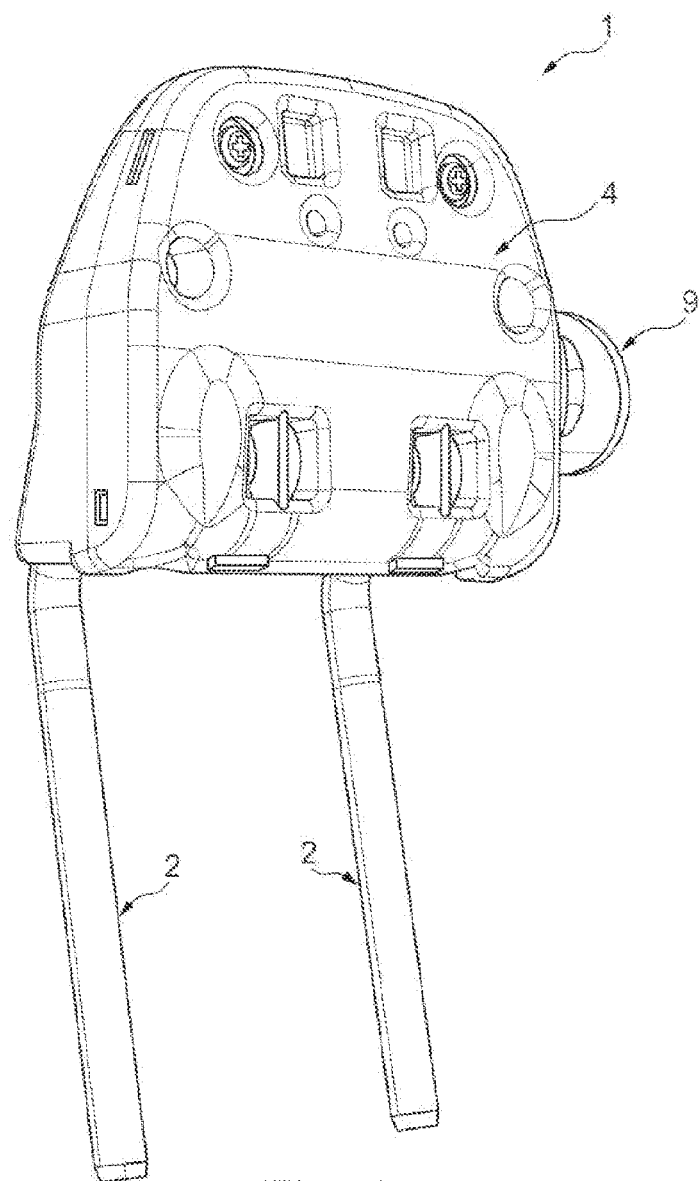
FIG. 1 is a partial diagrammatical view in perspective of a headrest according to an embodiment, with the housing in the raised position.
Figure 2:
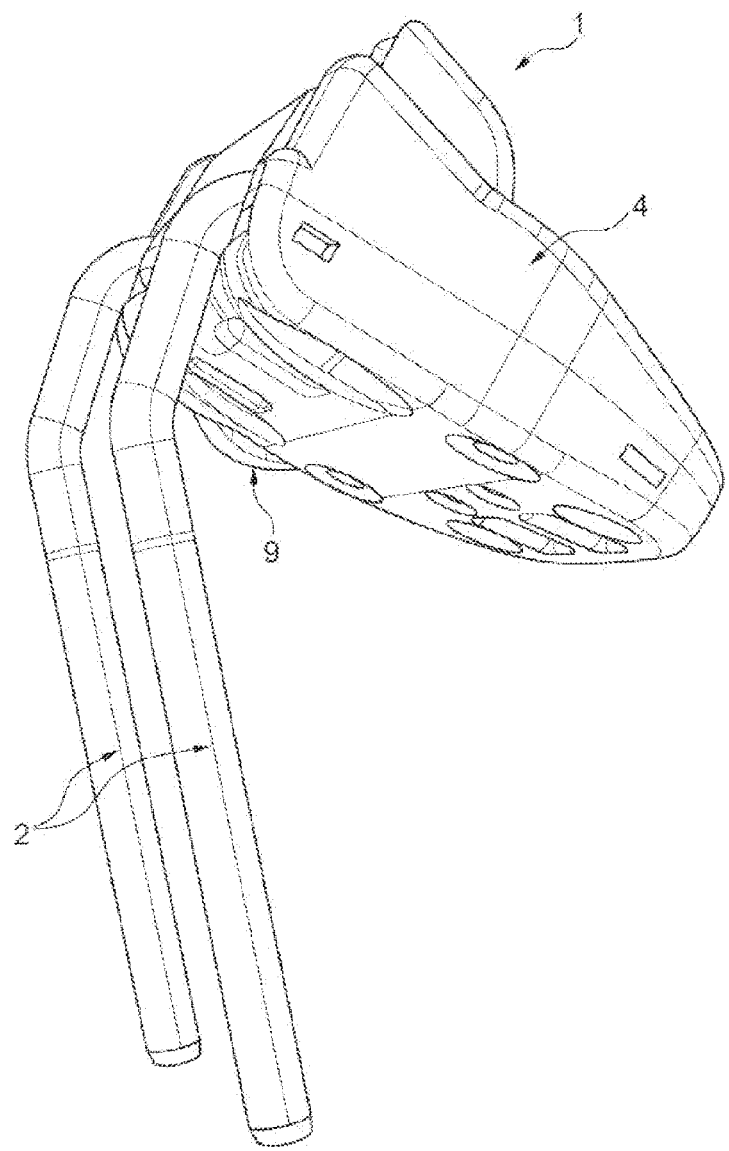
FIG. 2 is similar to FIG. 1, with a view according to another angle, the housing in lowered position.
Figure 3:
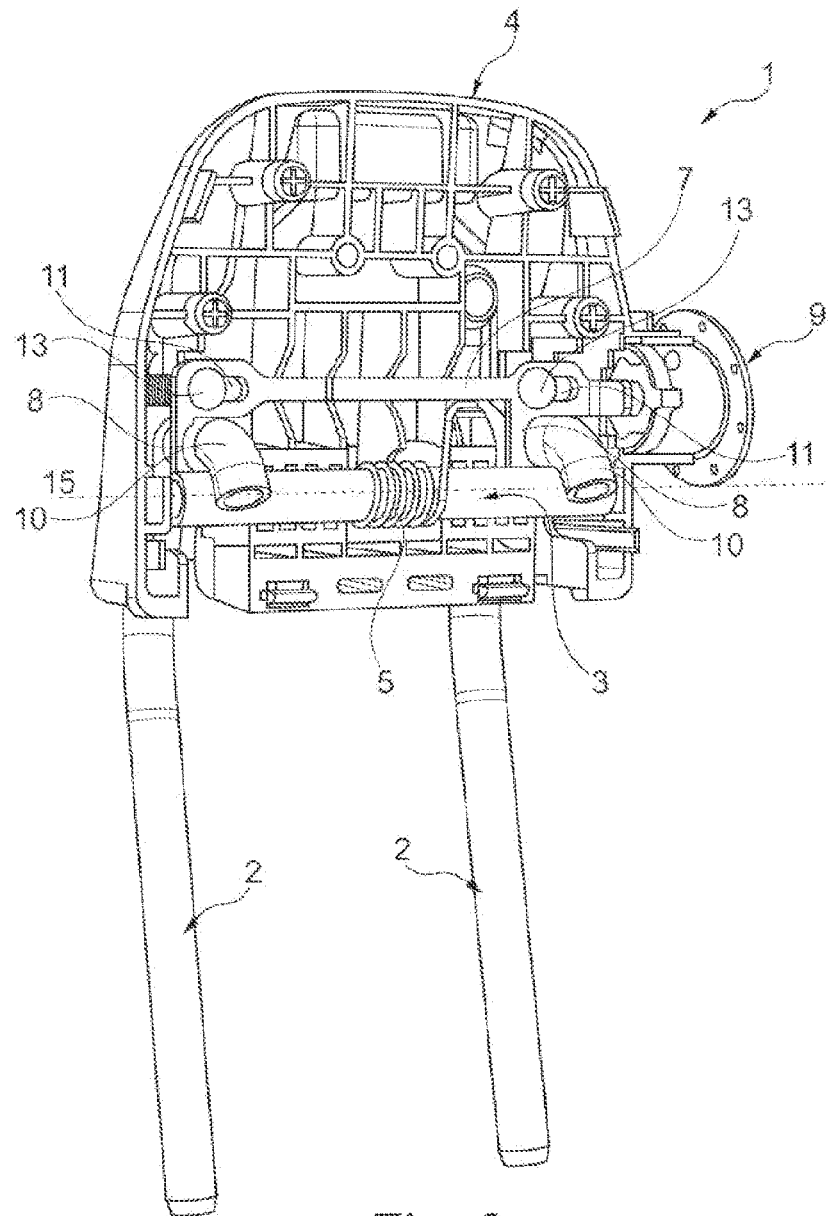
FIG. 3 is a partial diagrammatical view in perspective of the headrest of the preceding figures showing the inside of the housing.
Figure 4:
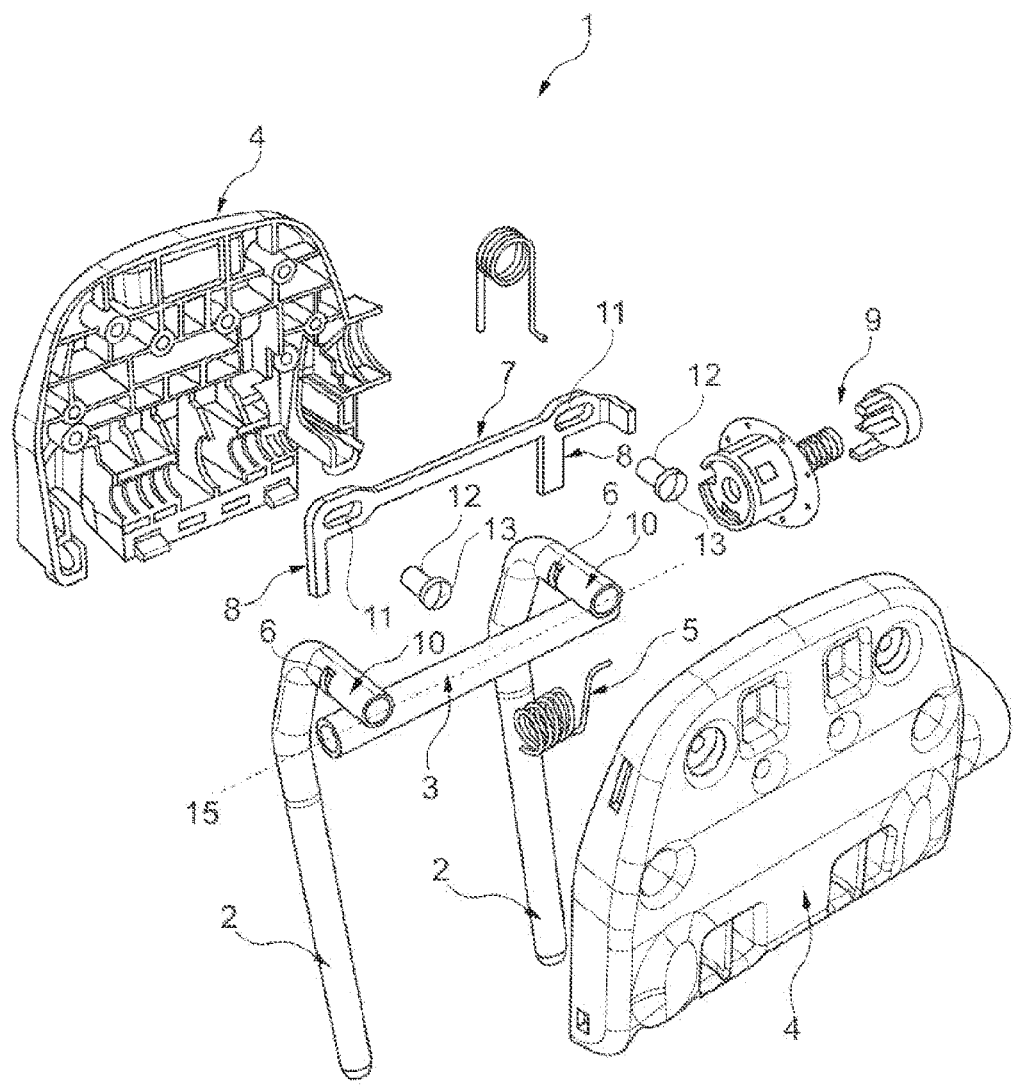
FIG. 4 is a partial perspective exploded view of the headrest of the preceding figures.
Figure 5:
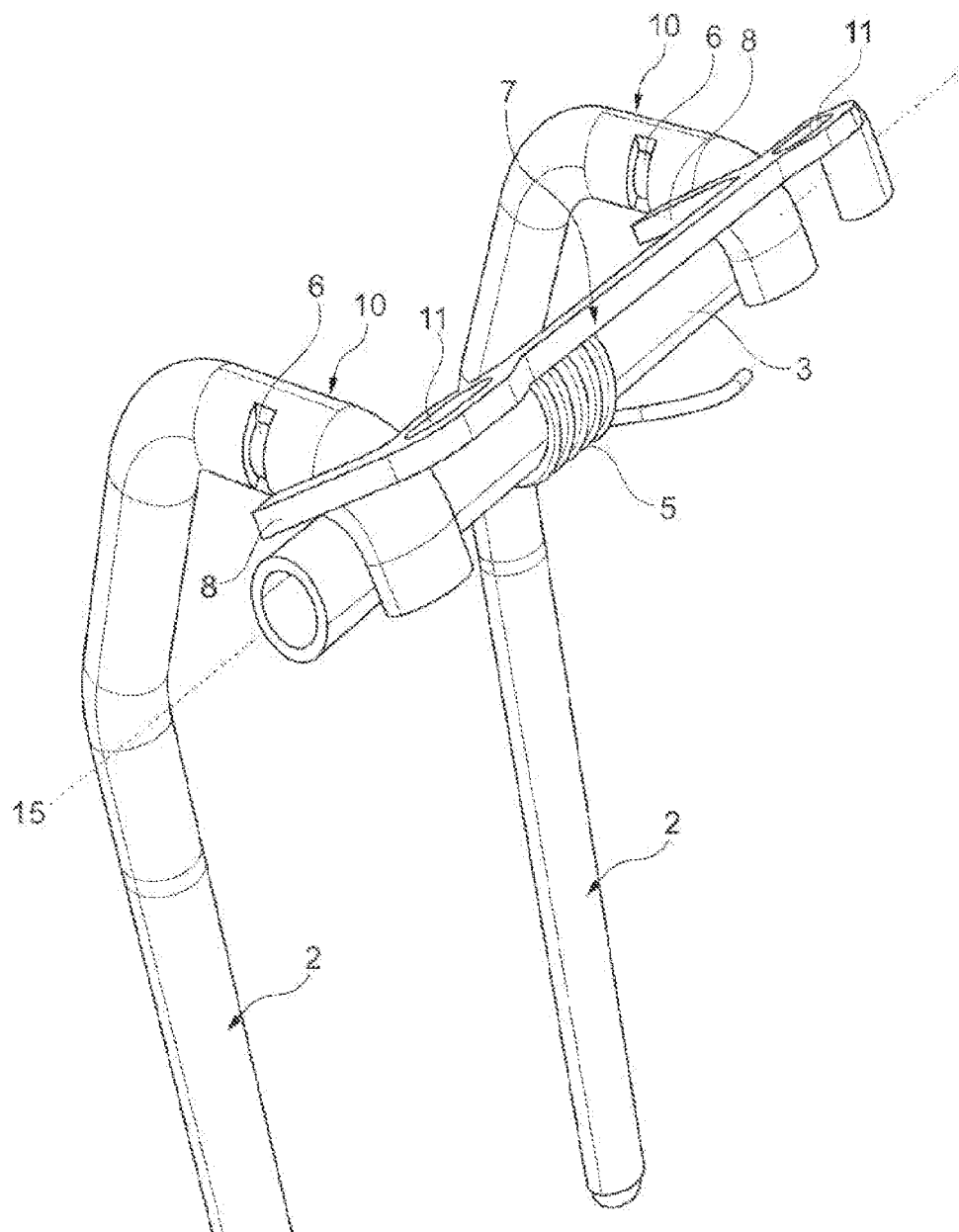
FIG. 5 is a detailed view in partial perspective of the headrest of the preceding figures, the housing in the process of actuating from one of the positions thereof to the other.

In reference to the figures, a headrest 1 for a motor vehicle seat is described, the headrest comprising:
- two parallel metal legs 2—in particular tubular for mounting on a seatback of the seat,
- a transverse strut 3—in particular made of metal, in particular tubular—connecting the upper portions 10 of the legs—the strut able to be fixed by welding, as shown here, or by nesting, or to be of a block with the legs—,
- a housing 4—here in two portions—made of moulded plastic material for the adsorption of energy in case of impact of the head of a passenger on the headrest, the housing being rotatably mounted about a transverse axis 15—here around the strut—, in such a way as to be able to switch from a raised position of use to a lowered position, here towards the front, of retraction,
an upholstered cushion of the housing,
a device for locking the housing in the raised position,
a first spring means 5 for actuating the housing to the lowered position thereof when the device is deactivated, the device comprising:
two locking catches 6 each formed in the upper portion 10 of each one of the legs,
a locking crosspiece 7 mounted with transversal sliding in the housing, in such a way as to be able to switch from a locking position to an unlocked position, the crosspiece being provided with two locking projections 8 fitting respectively into each one of the catches when the crosspiece is in the locking position,
a means for actuating the crosspiece to the unlocked position thereof,
a second spring means 16 for actuating the crosspiece to the locking position thereof when the housing is in the raised position and when the actuation means is not activated.

According to the embodiment shown in FIGS. 1 to 5, the actuating means of the crosspiece 7 has the form of a lateral button 9 arranged at the end of the crosspiece in such a way as to allow for the activation thereof by actuating to the unlocked position thereof.

According to the embodiment shown in FIGS. 1 to 5, the button 9 is actuated by the pressing exerted by a finger of the user.

Figure 6:
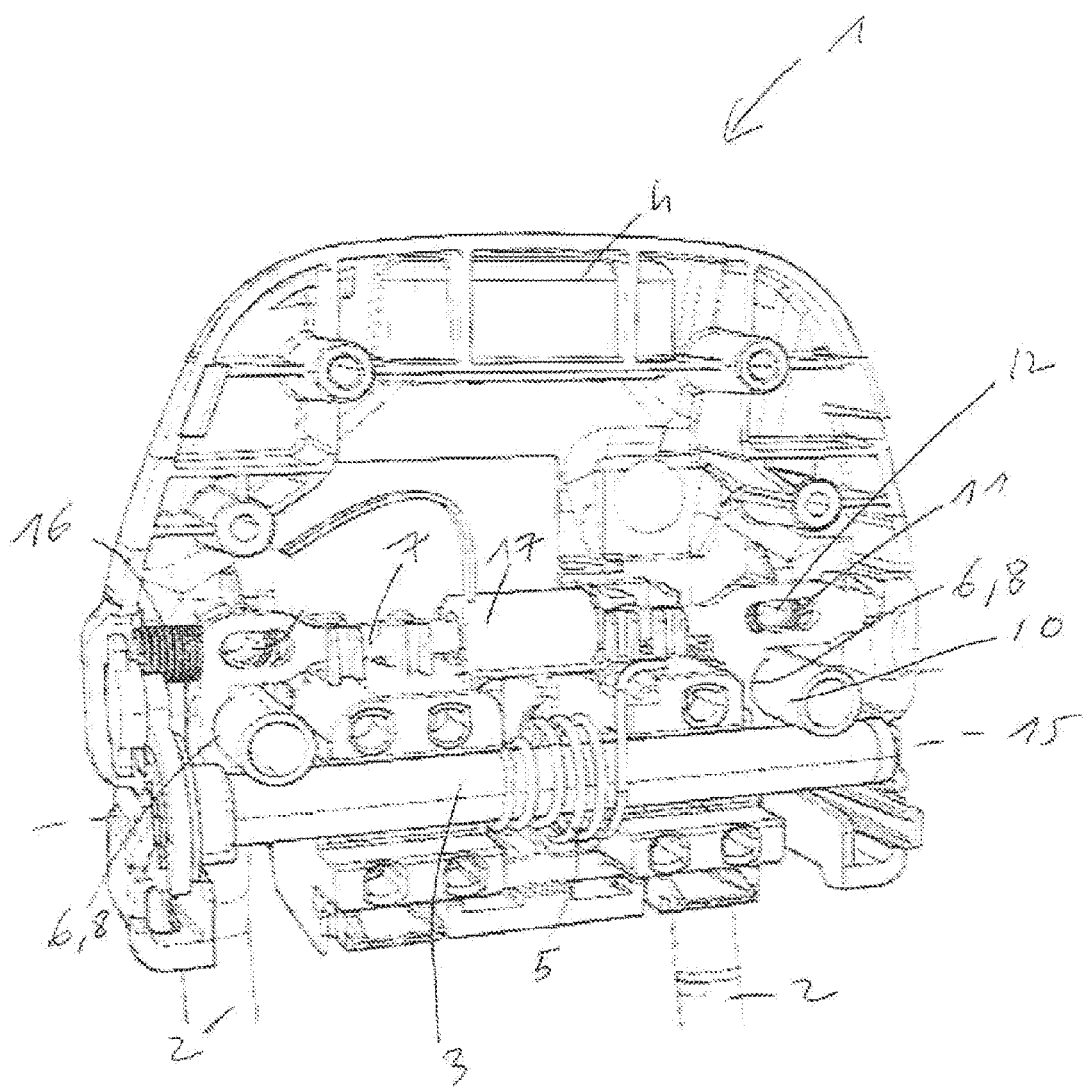
FIG. 6 is a partial diagrammatical view in perspective of a headrest according to another embodiment, the crosspiece being in a locking position.

According to the embodiment shown in FIG. 6, the actuating means of the crosspiece 7 is in the form of a solenoid 17, knowing that:
the solenoid is mounted in the housing 4,
the crosspiece has a metal base that can be attracted by a magnet,
the crosspiece is mounted so as to pass through the inside of the solenoid and to be able to slide therein,
the electrical power supply terminals of the solenoid are defined in such a way that the crosspiece adopts:
the locking position thereof in the absence of a power supply under the effect of the second spring means 16,
the unlocked position thereof in the presence of a power supply, against the second spring means.

Recall here that a solenoid is an elongated coil formed by a wound conductive wire that creates on the axis thereof a magnetic field when a current flows through it.

Such an arrangement makes it possible:
to avoid a multiplication of components since the solenoid 17 is coupled directly to the crosspiece 7 passing through it, via magnetic attraction, without intervention of an intermediate component such as a connecting rod,
to save space inside the housing 4.

According to the embodiments shown, the legs 2 have an upper portion 10 that is curved towards the front.

According to the embodiments shown, the catches 6 are arranged laterally on the legs 2, with the projections 8 being orientated vertically.

According to the embodiments shown, the crosspiece 7 is substantially inscribed in a flat plate, the crosspiece comprising two transversally-elongated lateral holes 11, the holes being passed through by two rods 12 for fixing—for example coming from screws or rivets—to the housing 4, the rods being provided at the free end thereof with a collar 13 for maintaining the crosspiece, the holes being arranged in such a way as to allow for a transversal clearance of the crosspiece between the locking and unlocked positions thereof.

In an alternative not shown, the rods 12 can come from moulding of the housing 4, with the free ends of the rods nesting in compartments provided in a cache mounted at the rear of the housing, in such a way as to maintain the crosspiece 7 in place for the transversal sliding thereof.

According to the embodiments shown, the first spring means 5 is in the form of a helical spring mounted around the strut 3.

In a manner not shown, it can be provided that the catches 6 have a lateral enlargement in such a way as to facilitate, by "the funnel effect", the insertion of the projections 8 during the setting of the crosspiece 7 to the locking position.

Such an arrangement makes it possible to overcome any dimensional dispersions that would prevent one of the projections 8 from being perfectly positioned facing the corresponding catch 6 although the other of the projections is correctly positioned.

In an alternative, or cumulative manner, it can be provided that the projections 8 are laterally thinned, in such a way as to have a tapered section making it possible to facilitate the insertion thereof into the catches 6.

What is claimed is:

1. A headrest for a motor vehicle seat, the headrest comprising:
two metal legs equidistant from each other along their entire lengths and comprising an upper portion, the two metal legs configured for mounting on a seatback of the seat,
a transverse strut interconnecting the upper portions of the legs,
a housing made of moulded plastic material for the adsorption of energy in case of impact of the head of a passenger on the headrest, the housing being rotatably mounted about a transverse axis, configured to switch from a raised position of use to a retracted lowered position,
an upholstered cushion of the housing,
a device for locking the housing in the raised position,
a first spring for actuating the housing to the lowered position when the device is deactivated, the headrest wherein the device comprises:
two locking catches each formed in the upper portion of each one of the legs,
a locking crosspiece, formed from a single piece, slidably mounted for transverse sliding in the housing, configured to switch from a locking position to an unlocked position, the crosspiece being provided with two locking projections fitting respectively into each one of the catches when the crosspiece is in the locking position,
an actuator for actuating the crosspiece to the unlocked position,
a second spring for actuating the crosspiece to the locking position thereof when the housing is in the raised position and when the actuator is not activated.

2. The headrest according to claim 1, wherein the actuator of the crosspiece has the form of a lateral button arranged at the end of the crosspiece for the actuating the crosspiece to the unlocked position.

3. The headrest according to claim 2, wherein the button is actuated by the pressing exerted by a finger of a passenger.

4. The headrest according to claim 1, wherein the actuator of the crosspiece is in the form of a solenoid further comprising:
the solenoid is mounted in the housing,
the crosspiece has a metal base that can be attracted by a magnet, the crosspiece is mounted to pass through the inside of the solenoid and configured to slide therein, the electrical power supply terminals of the solenoid are defined in such a way that the crosspiece adopts:

the locking position in the absence of a power supply under the effect of the second spring, and the unlocked position in the presence of a power supply, against the second spring.

5. The headrest according to claim 1, wherein the legs have an upper portion that is curved towards the front.

6. The headrest according to claim 1, wherein the catches are arranged laterally on the legs, with the projections being orientated vertically.

7. The headrest according to claim 1, wherein the crosspiece is substantially inscribed in a flat plate, the crosspiece comprising two transversally-elongated lateral holes, the holes being passed through by two rods fixed to the housing, the rods each having a free end comprising a collar for maintaining the crosspiece, the holes being arranged to allow for a transversal clearance of the crosspiece between the locking and unlocked positions.

8. The headrest according to claim 1, wherein the first spring is in the form of a helical spring mounted around the strut.

9. The headrest according to claim 1, wherein the catches have a lateral enlargement to facilitate an insertion of projections during the setting of the crosspiece to the locking position.

10. The headrest according to claim 1, wherein the projections are laterally thinned, to have a tapered section to facilitate an insertion of the projections into the catches.

* * * * *